(12) United States Patent
Shimodaira et al.

(10) Patent No.: US 9,973,364 B2
(45) Date of Patent: May 15, 2018

(54) GENERALIZED FREQUENCY DIVISION MULTIPLEXING (GFDM) FRAME STRUCUTRE FOR IEEE 802.11AY

(71) Applicant: INTEL IP CORPORATION, Santa Clara, CA (US)

(72) Inventors: Hidekazu Shimodaira, Tokyo (JP); Ali Sadri, San Diego, CA (US); Joongheon Kim, San Jose, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 0 days. days.

(21) Appl. No.: 15/193,374

(22) Filed: Jun. 27, 2016

(65) Prior Publication Data
US 2017/0373903 A1 Dec. 28, 2017

(51) Int. Cl.
| | |
|---|---|
| H04L 27/26 | (2006.01) |
| H04L 5/00 | (2006.01) |
| H04L 1/00 | (2006.01) |
| H04W 4/00 | (2018.01) |
| H04B 1/40 | (2015.01) |

(52) U.S. Cl.
CPC .......... H04L 27/2628 (2013.01); H04B 1/40 (2013.01); H04L 1/0071 (2013.01); H04L 5/0007 (2013.01); H04W 4/008 (2013.01)

(58) Field of Classification Search
CPC ........ H03M 13/1102; H04J 2011/0009; H04L 2025/03414; H04L 27/2601; H04L 69/22
See application file for complete search history.

(56) References Cited

U.S. PATENT DOCUMENTS

| | | | | |
|---|---|---|---|---|
| 9,160,600 | B2* | 10/2015 | Kudo | H04L 25/03159 |
| 9,432,298 | B1* | 8/2016 | Smith | H04L 49/9057 |
| 2005/0111525 | A1* | 5/2005 | Driesen | H04L 25/061 375/147 |
| 2008/0175265 | A1* | 7/2008 | Yonge | H04B 3/54 370/447 |
| 2014/0101512 | A1* | 4/2014 | Djordjevic | H03M 13/1148 714/758 |
| 2015/0071242 | A1* | 3/2015 | Vilaipornsawai | H04L 25/0224 370/330 |
| 2016/0198471 | A1* | 7/2016 | Young | H04W 72/1273 370/329 |
| 2016/0373172 | A1* | 12/2016 | Mendes | H04L 1/0057 |
| 2016/0381695 | A1* | 12/2016 | Zhang | H04W 76/021 370/329 |
| 2017/0063590 | A1* | 3/2017 | Dhananjay | H04L 27/2662 |

* cited by examiner

*Primary Examiner* — Ross Varndell
(74) *Attorney, Agent, or Firm* — Jason H. Vick; Sheridan Ross, PC

(57) ABSTRACT

In 60 GHz WiGig/IEEE 802.11ad, Orthogonal Frequency Division Multiplexing (OFDM) is used to achieve higher throughput. However, OFDM has one problem of high Peak-to-Average Power Ratio (PAPR) caused by the summing up of the large number of subcarriers. A high PAPR signal degrades the efficiency of power amplifier (PA) and may cause spurious emissions because of the PA non linearity. In order to reduce PAPR, Generalized Frequency Division Multiplexing (GFDM) which has the characteristics of both single carrier and multi carrier transmission has been studied. By introducing GFDM, the number of subcarriers can be decreased while still maintaining a high throughput.

24 Claims, 19 Drawing Sheets

| Element ID | Length | STA Address | AID | mmWave STA Capability Information | mmWave PCP/AP Capability Information |
|---|---|---|---|---|---|
| 1 | 1 | 6 | 1 | 8 | 2 |

Octets:

1414
1410

1420

| RXSS Length | Antenna Reciprocity | A-MPDA Parameters | BA With Flow | Supportd MCS Set | DTP Supported | Reserved |
|---|---|---|---|---|---|---|
| B14-B19 | B20 | B21-26 | B27 | B28-B51 | 52 | B53-B63 |

Bit:

1430

| Maximum SC Rx MCS | Maximum OFDM Rx MCS | Maximum SC Tx MCS | Maximum OFDM Tx MCS | Low Power SC PHY Supported | Code Rate 13/16 | Reserved |
|---|---|---|---|---|---|---|
| 5 | 5 | 5 | 5 | 1 | 1 | 2 |

Bits:

Fig. 14

GENERALIZED FREQUENCY DIVISION MULTIPLEXING (GFDM) FRAME STRUCUTRE FOR IEEE 802.11AY

TECHNICAL FIELD

An exemplary aspect is directed toward communications systems. More specifically an exemplary aspect is directed toward wireless communications systems and even more specifically to wireless communications systems. Even more specifically, exemplary aspects are at least directed toward one or more of IEEE (Institute of Electrical and Electronics Engineers) 802.11ay communications systems, 60 GHz communications systems, millimetre wave communications systems (mmWave systems), WiGig (Wireless Gigabit Alliance) communications systems, TGig communications systems, IEEE 802.11ad communications systems, 5G waveform communications systems, radio frequency equipment operating above 31.8 Ghz, and the like.

BACKGROUND

Wireless networks transmit and receive information utilizing varying techniques and protocols. For example, but not by way of limitation, two common and widely adopted techniques used for communication are those that adhere to the Institute for Electronic and Electrical Engineers (IEEE) 802.11 standards such as the IEEE 802.11n standard, the IEEE 802.11ac standard and the IEEE 802.11ax standard.

The IEEE 802.11 standards specify a common Medium Access Control (MAC) Layer which provides a variety of functions that support the operation of IEEE 802.11-based Wireless LANs (WLANs) and devices. The MAC Layer manages and maintains communications between IEEE 802.11 stations (such as between radio network interface cards (NIC) in a PC or other wireless device(s) or stations (STA) and access points (APs)) by coordinating access to a shared radio channel and utilizing protocols that enhance communications over a wireless medium.

IEEE 802.11ax is the successor to 802.11ac and is proposed to increase the efficiency of WLAN networks, especially in high density areas like public hotspots and other dense traffic areas. IEEE 802.11ax also uses orthogonal frequency-division multiple access (OFDMA), and related to IEEE 802.11ax, the High Efficiency WLAN Study Group (HEW SG) within the IEEE 802.11 working group is considering improvements to spectrum efficiency to enhance system throughput/area in high density scenarios of APs (Access Points) and/or STAs (Stations).

The Wireless Gigabit Alliance (WiGig) developed and promoted the adoption of multi-gigabit per second speed wireless communications technology operating over the unlicensed 60 GHz frequency band.

The WiGig specification allows devices to communicate without wires at multi-gigabit speeds. The specification enables high performance wireless data, display and audio applications that supplement the capabilities of previous wireless LAN devices. WiGig tri-band enabled devices, which operate in the 2.4, 5 and 60 GHz bands, deliver data transfer rates up to 7 Gbit/s, about as fast as an 8-band 802.11ac transmission, and more than 11 times faster than the highest IEEE 802.11n rate, while maintaining compatibility with existing Wi-Fi devices. The 60 GHz signal cannot typically penetrate walls but can propagate off reflections from walls, ceilings, floors and objects using beamforming built into the WiGig system. When roaming away from a main or central point, the protocol can switch to make use of the other lower bands at a much lower rate, both of which can propagate through walls.

Bluetooth® is a wireless technology standard adapted to exchange data over, for example, short distances using short-wavelength UHF radio waves in the ISM band from 2.4 to 2.485 GHz. Bluetooth® is commonly used to communicate information from fixed and mobile devices and for building personal area networks (PANs). Bluetooth® Low Energy (BLE), also known as Bluetooth® Smart®, utilizes less power than Bluetooth® but is able to communicate over the same range as Bluetooth®.

Wi-Fi (IEEE 802.11) and Bluetooth® are somewhat complementary in their applications and usage. Wi-Fi is usually access point-centric, with an asymmetrical client-server connection with all traffic routed through the access point (AP), while Bluetooth® is typically symmetrical, between two Bluetooth® devices. Bluetooth® works well in simple situations where two devices connect with minimal configuration like the press of a button, as seen with remote controls, between devices and printers, and the like. Wi-Fi tends to operate better in applications where some degree of client configuration is possible and higher speeds are required, especially for network access through, for example, an access node. However, Bluetooth® access points do exist and ad-hoc connections are possible with Wi-Fi though not as simply configured as Bluetooth®.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 14 shows an exemplary frame structure;

DESCRIPTION OF EMBODIMENTS

Figure 1:
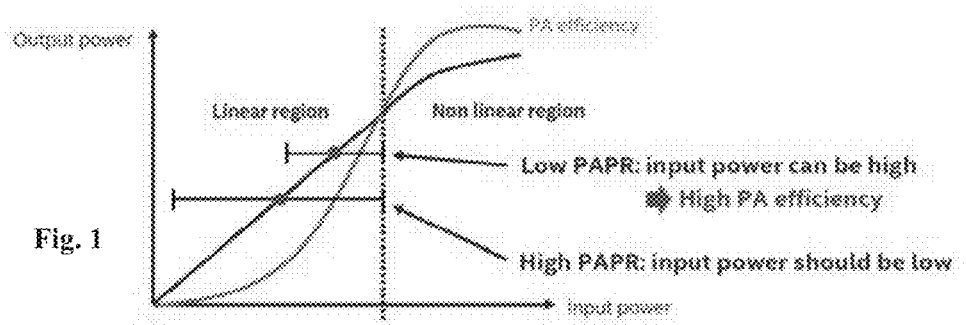
FIG. 1 illustrates a chart of PAPR non-linearity.

In 60 GHz WiGig/IEEE 802.11ad, Orthogonal Frequency Division Multiplexing (OFDM) is used to achieve higher throughput. However, OFDM has one problem of high Peak-to-Average Power Ratio (PAPR) caused by the summing up of the large number of subcarriers. A high PAPR signal degrades the efficiency of power amplifier (PA) and may cause spurious emissions because of the PA non linearity. (See FIG. 1)

In order to reduce PAPR, Generalized Frequency Division Multiplexing (GFDM) which has the characteristics of both single carrier and multi carrier transmission has been studied. By introducing GFDM, the number of subcarriers can be decreased while still maintaining a high throughput.

However, GFDM with the small number of subcarriers wastes frequency resources because of the wider subcarrier bandwidth. In general, multicarrier transmission needs to make the DC subcarrier be null to avoid any DC offset. The wider subcarrier bandwidth and DC nulling cause resource further wasting. Additionally, GFDM causes Inter carrier Interference (ICI) because of the subcarrier non-orthogonality.

GFDM viability studies have focused on the performance evaluation and have not considered DC null problem. On the other hand, an ICI reduction scheme for GFDM has been studied. However, these studies assume that an ICI reduction block is installed on receiver side of the communication system.

One exemplary embodiment is directed toward a technique for DC null shrinkage by applying subcarrier upshifting and down shifting. Additionally, a transmitter side ICI reduction scheme is proposed to at least reduce computational complexity and receiver side power consumption.

One non-limiting exemplary advantage of the proposed DC null shrinkage scheme makes GFDM useful at least for one or more of mmWave systems, IEEE 802.11ay and/or GFDM, and can at least significantly improve the PAPR performance while keeping almost the same or the same throughput performance as that of OFDM. The transmitter side ICI reduction scheme can also reduce computational complexity and also reduce receiver power consumption.

The Exemplary DC Null Shrinkage Scheme

Figure 2:
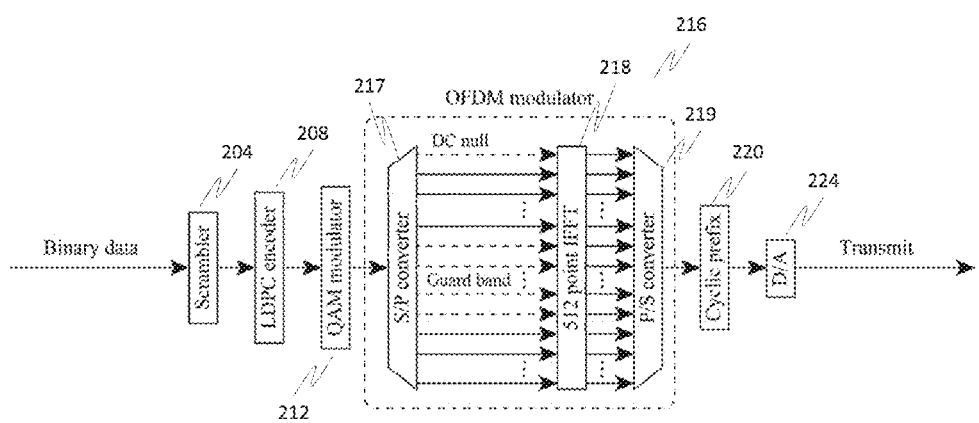
FIG. 2 illustrates an exemplary transmitter and OFDM modulator.
Figure 3:
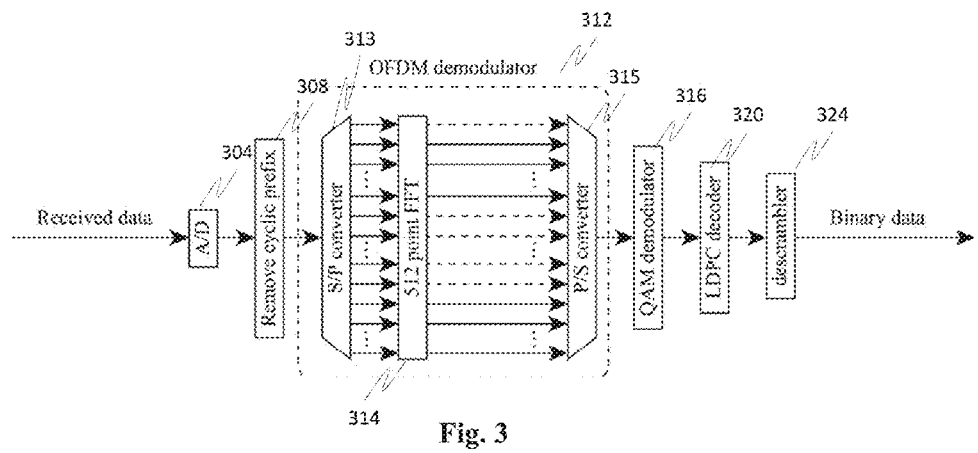
FIG. 3 illustrates an exemplary receiver and OFDM demodulator.

In 60 GHz WiGig/IEEE 802.11ad OFDM transmissions, 512 subcarriers are used. Three subcarriers around DC and 157 subcarriers at both ends are nullified for DC null and guard band insertion. Therefore, a total of 352 subcarriers are used for data transmission. Block diagrams of OFDM transmitters and receivers are shown in FIGS. 2 and 3, respectively. The OFDM transmitter (modulator) 216 comprises a scrambler 204, an LDPC (Low Density Parity Code) encoder 208, a Quadrature Amplitude (QAM) Modulator 212, a serial/parallel converter 217, an IFFT (inverse Fast Fourier Transform) 218, a parallel to serial converter 219, a cyclic prefix appender 220 and a digital to analog converter 224.

The OFDM receiver (demodulator) 312 comprises an analog to digital converter 304, a cyclic prefix remover 308, a serial to parallel converter 313, a Fast Fourier Transformer 314, a parallel to serial converter 315 a QAM demodulator 316 an LDPC decoder 320 and a descrambler 324.

Figure 4:
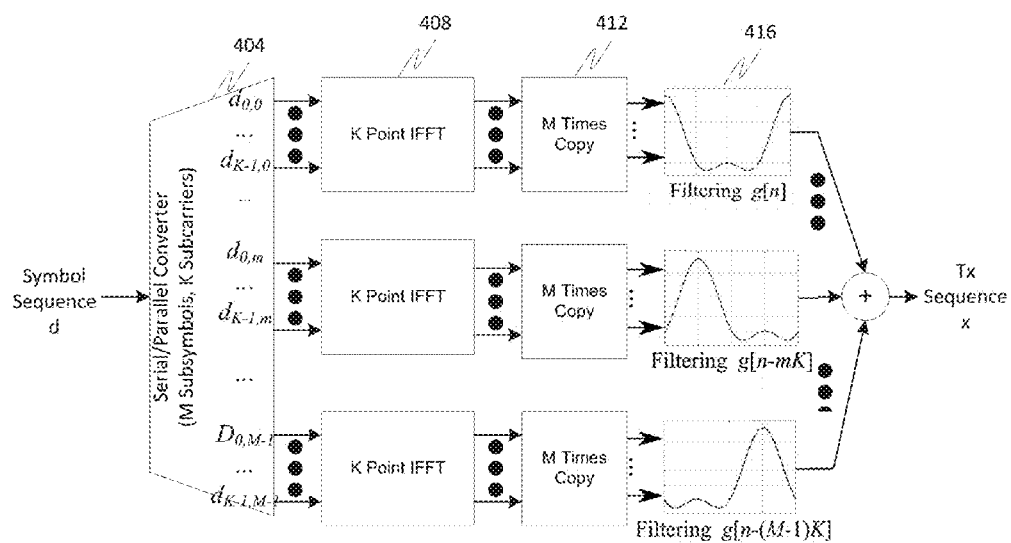
FIG. 4 illustrates an exemplary GFDM modulator.
Figure 5:
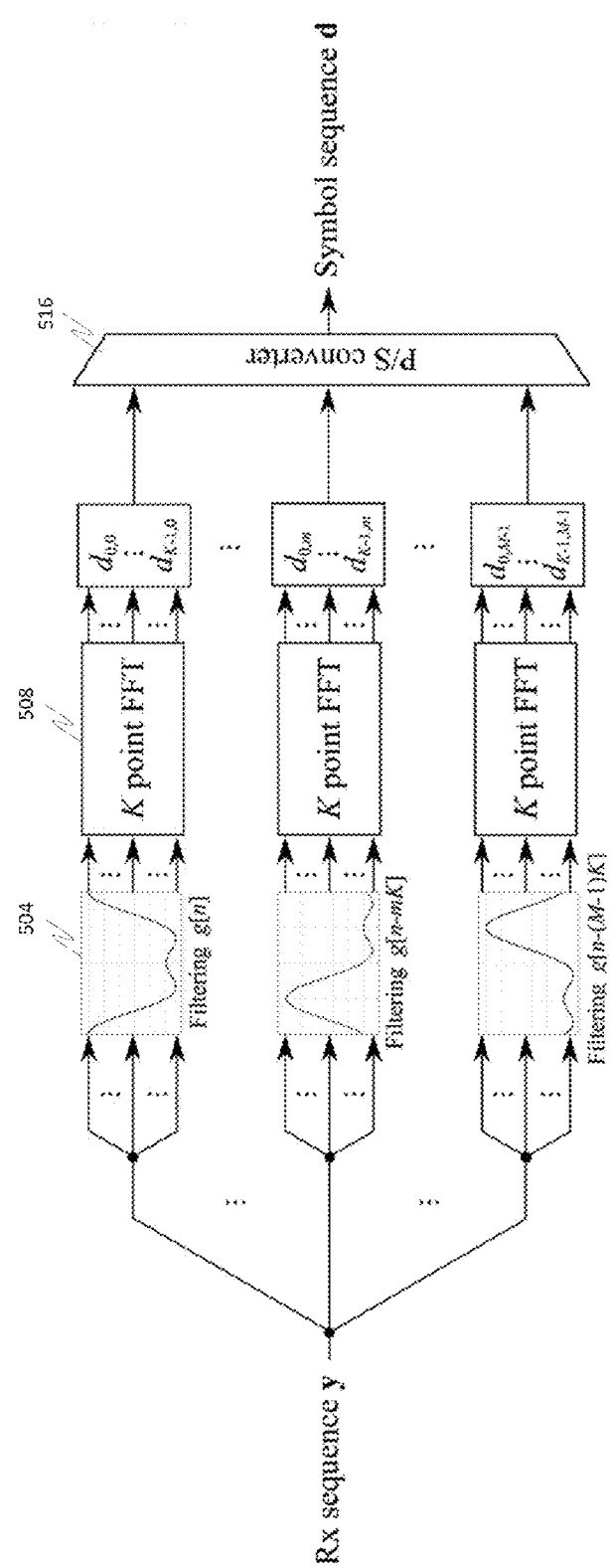
FIG. 5 illustrates an exemplary GFDM demodulator.

With an exemplary embodiment of GFDM, only the dashed rectangular blocks (modulators and demodulators) from FIGS. 2 and 3 are modified. FIGS. 4-5 show an exemplary basic GFDM transmitter and receiver block, respectively.

FIG. 4 includes a serial to parallel converter 404, IFFTs 408, copy blocks 412 and filtering blocks 416. FIG. 5 includes filtering blocks 504, FFTs 508 and a parallel to serial converter 516. In FIGS. 4-5, M and K represent the number of subsymbols and subcarriers, respectively.

Figure 6:
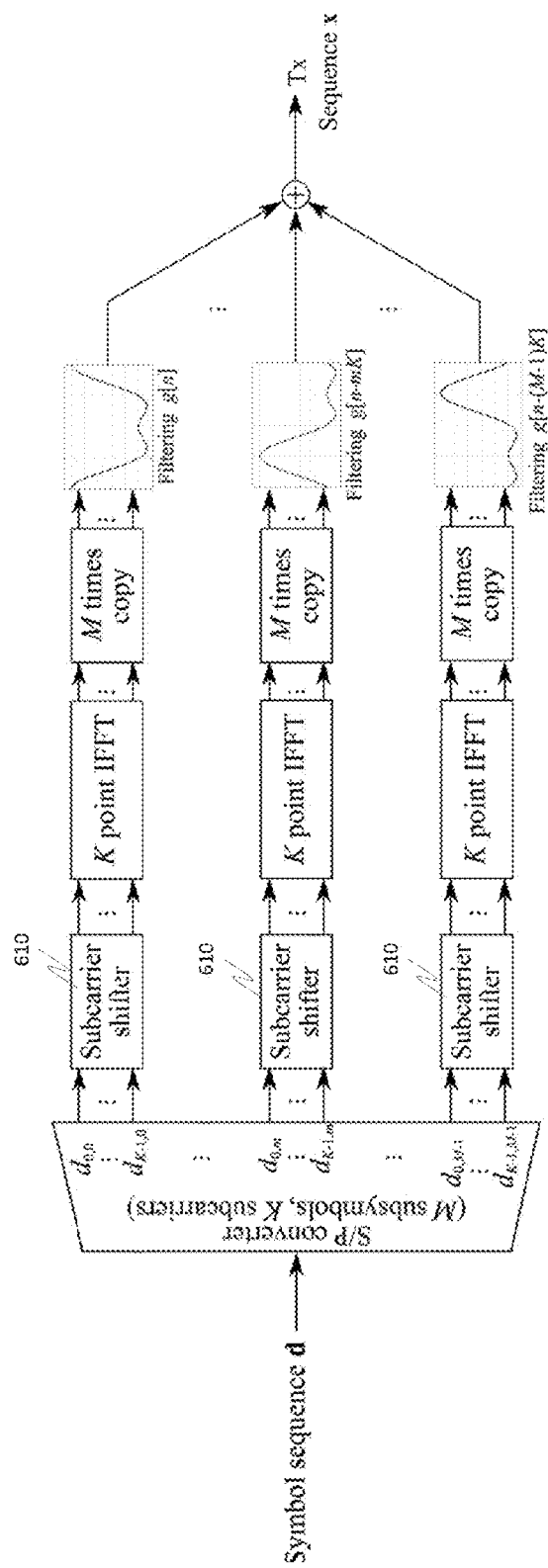
FIG. 6 illustrates an exemplary GFDM modulator with a subcarrier shifter.
Figure 7:
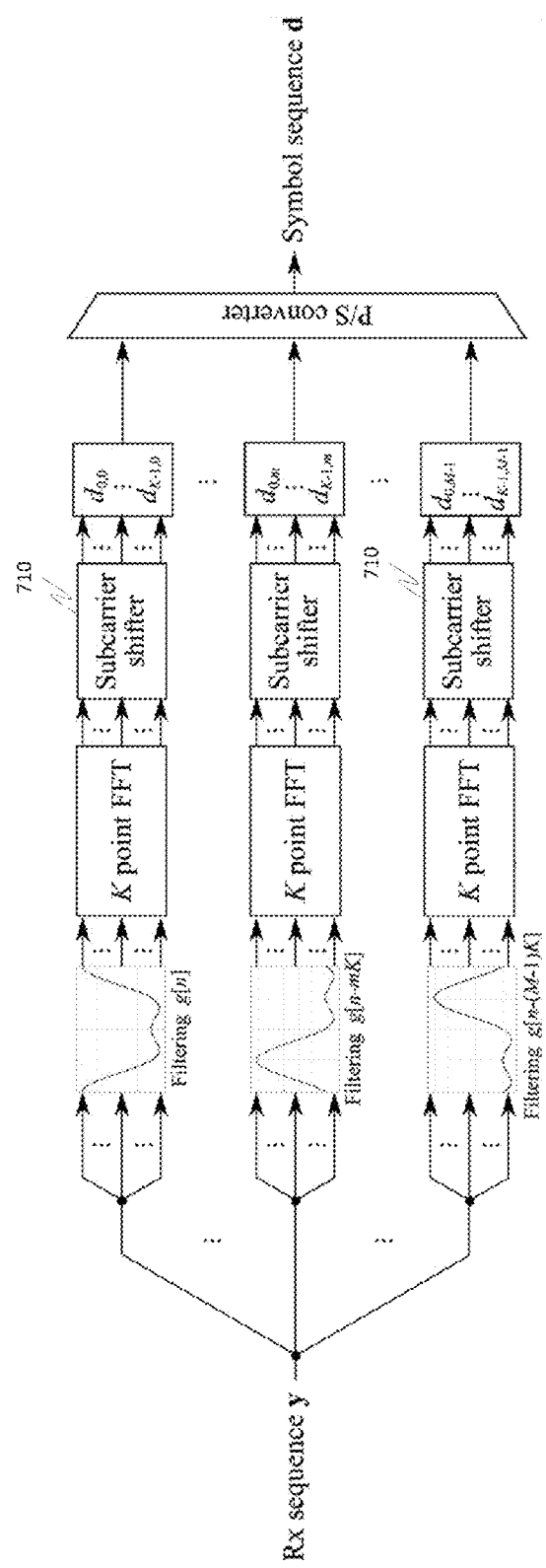
FIG. 7 illustrates an exemplary GFDM demodulator with a subcarrier shifter.

FIGS. 6-7 illustrate an exemplary enhanced GFDM transmitter and receiver structures, respectively. In these exemplary embodiments, subcarrier shifters 610 have been added after the serial to parallel converter in FIG. 6, and before the parallel to serial converter in FIG. 7 (Shifter 710).

In accordance with one exemplary embodiment, the lower side and higher side subcarriers are shifted by the shifters (610, 710) toward DC by downshifting and upshifting, respectively, as discussed in more detail herein.

Figure 8:
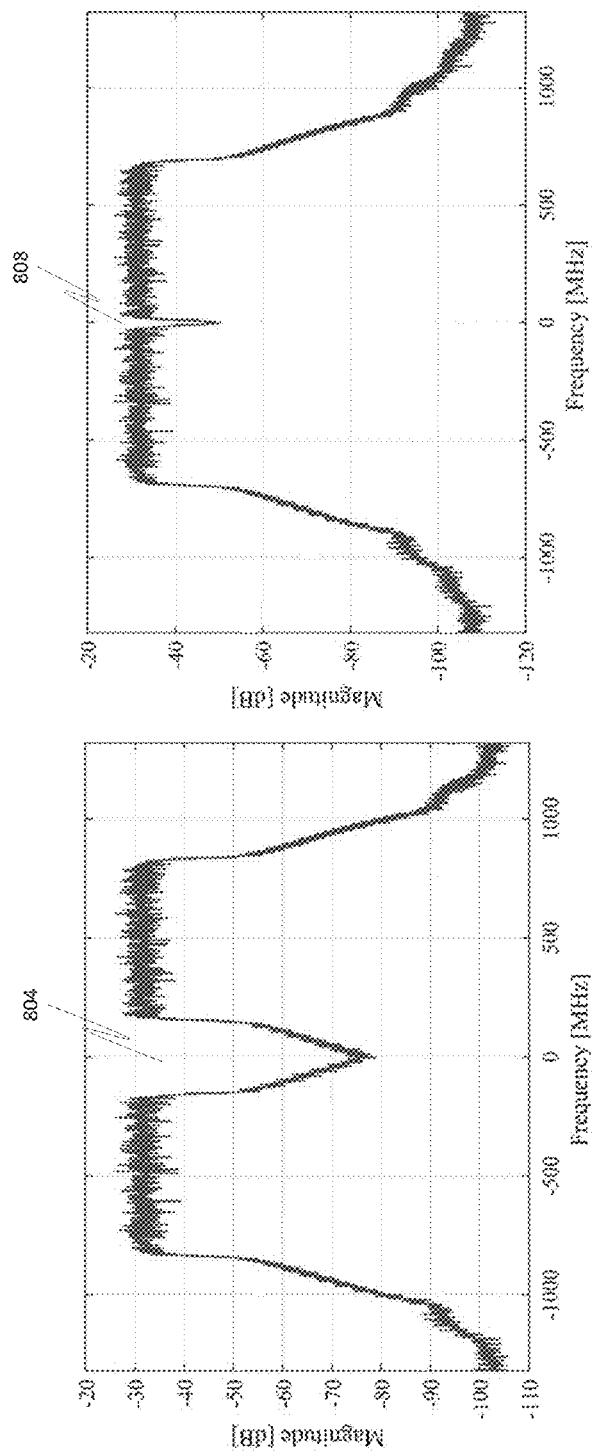
FIG. 8 shows a Power Spectral density comparison before subcarrier shifting and after subcarrier shifting.
Figure 9:
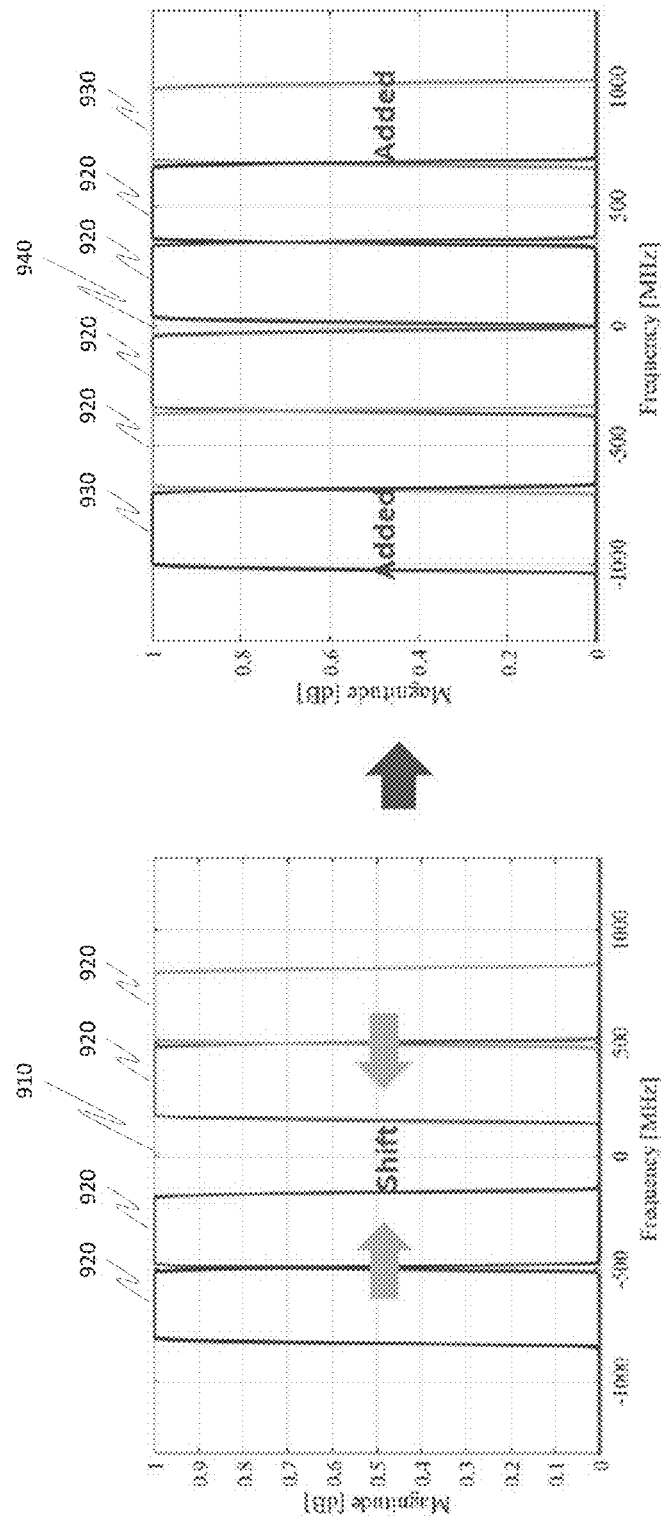
FIG. 9 shows an exemplary set of shifted subcarriers.

FIG. 8 shows the power spectral density (PSD) of GFDM before subcarrier shifting (left) and after subcarrier shifting (right). By introducing the shifting blocks described above, the DC null area 804 can be reduced 808 as shown in the right-hand portion of FIG. 8. FIG. 9 shows a similar DC null area reduction with an alternative representation. Here, on the left-hand side, the DC null area 910 is the area to be reduced. On the right-hand side of FIG. 9. subcarriers 920 have been shifted, subcarriers 930 can optionally be added and the DC null area 940 has been reduced.

Figure 10:
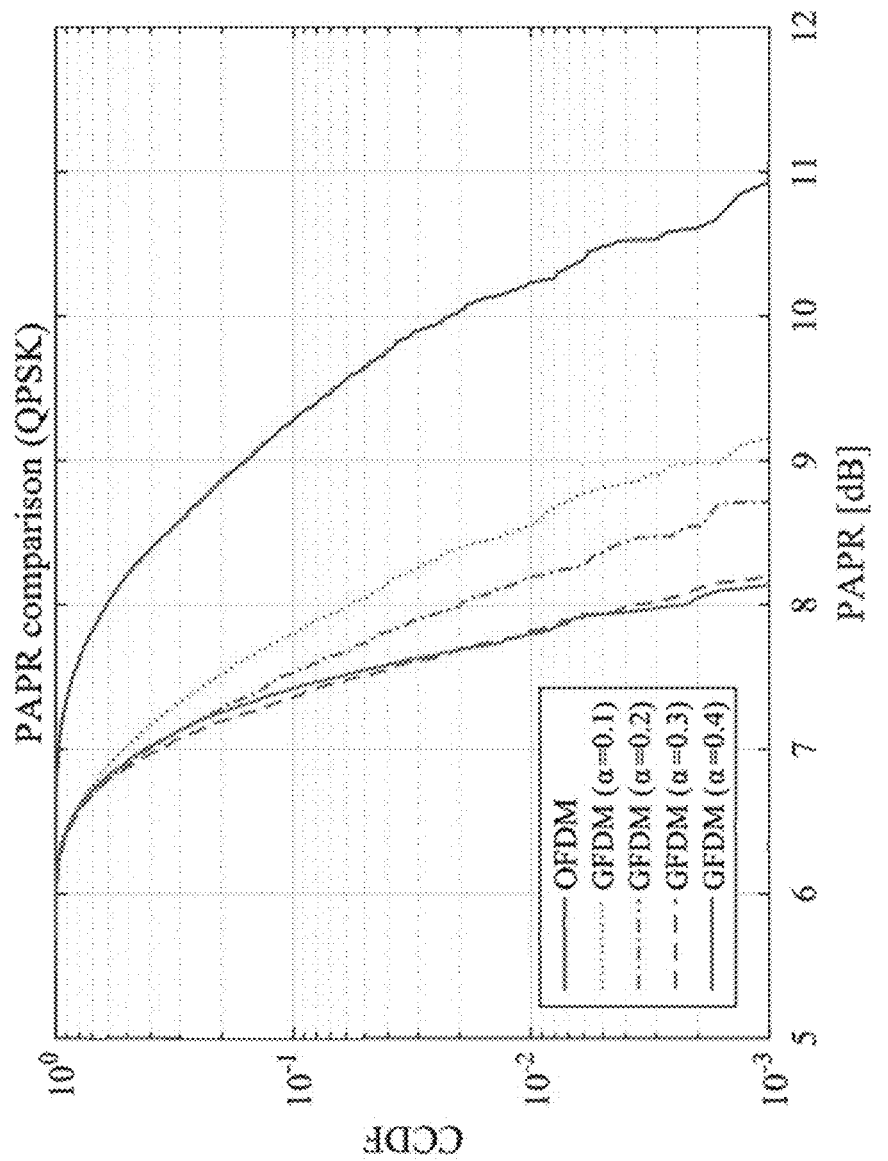
FIG. 10 shows a PAPR comparison.
Figure 11:
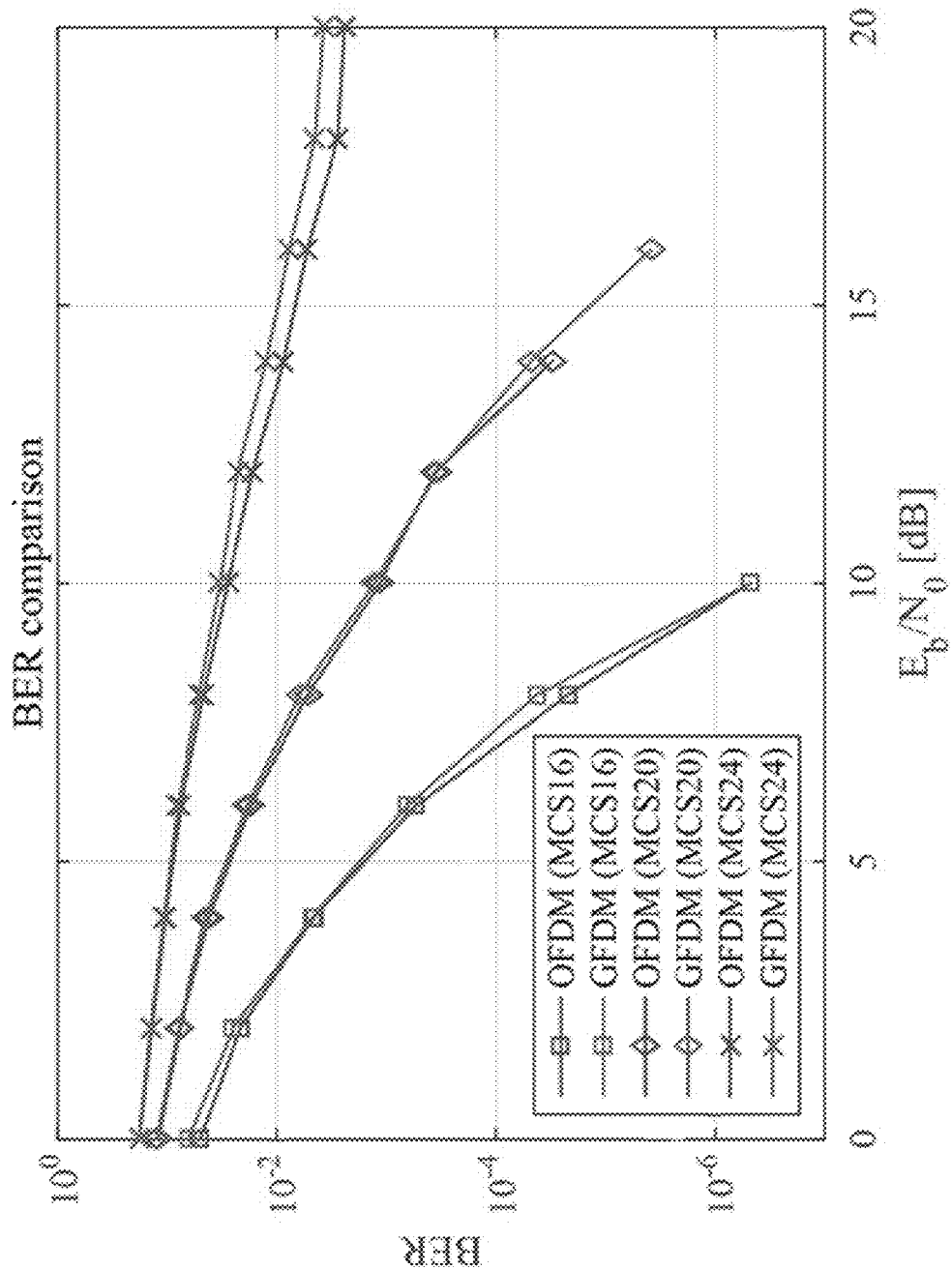
FIG. 11 shows a BER comparison.

FIGS. 10-11 show the PAPR performance of QPSK transmission and BER performance and in particular a comparison of PAPR (FIG. 10) and BER (FIG. 11). In an exemplary QPSK transmission with roll off factor of 0.4, it can be seen that PAPR can be reduced up to 3 dB and BER performances of GFDM are almost same as that of OFDM.

Transmitter Side ICI (Inter-Channel Interference) Reduction

Because of subcarrier non-orthogonality, GFDM systems can benefit from an ICI reduction block. Conventionally, an ICI reduction block is installed on receiver side. However, since receiver-side ICI reduction needs signal estimation and ICI reduction per subcarrier, computational cost and power consumption are high.

If the receiver side is mobile terminal, this could lead to increased power consumption, increased computational demand, etc., and can lead to quicker battery depletion.

Figure 12:
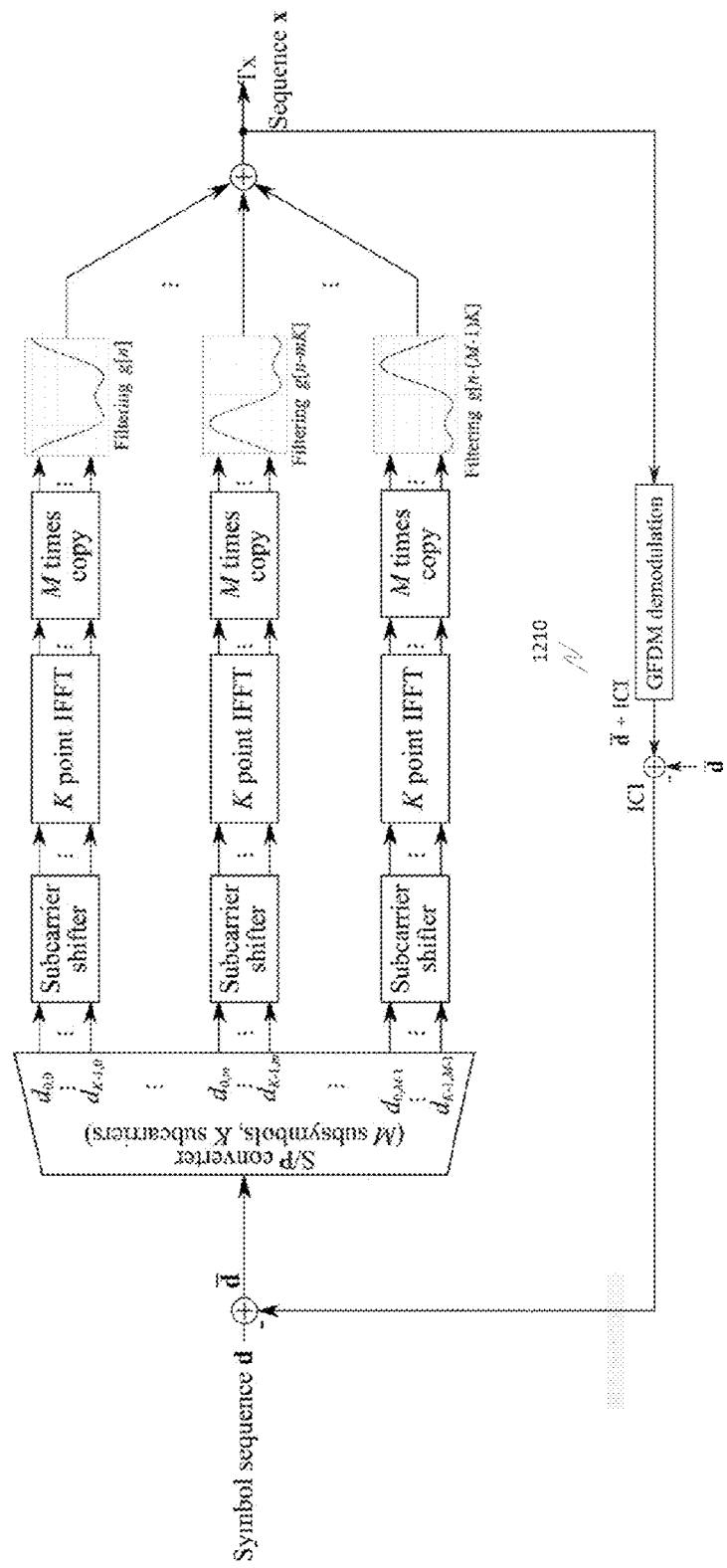
FIG. 12 shows an exemplary GFDm demodulator with an ICI reduction circuitry.

However, since the ICI of GFDM is self-interference, the transmitter side of the communications system can calculate ICI and eliminate it through preprocessing. FIG. 12 shows exemplary enhanced transmitter components with ICI reduction componentry 1210.

One exemplary advantage of this configuration is that the receiver side ICI reduction needs a channel estimation block and ICI calculations per subcarrier. On the other hand, a transmitter side ICI reduction configuration, such as that illustrated in FIG. 12, does not need these blocks since the transmitter knows the symbol sequence.

Figure 13:
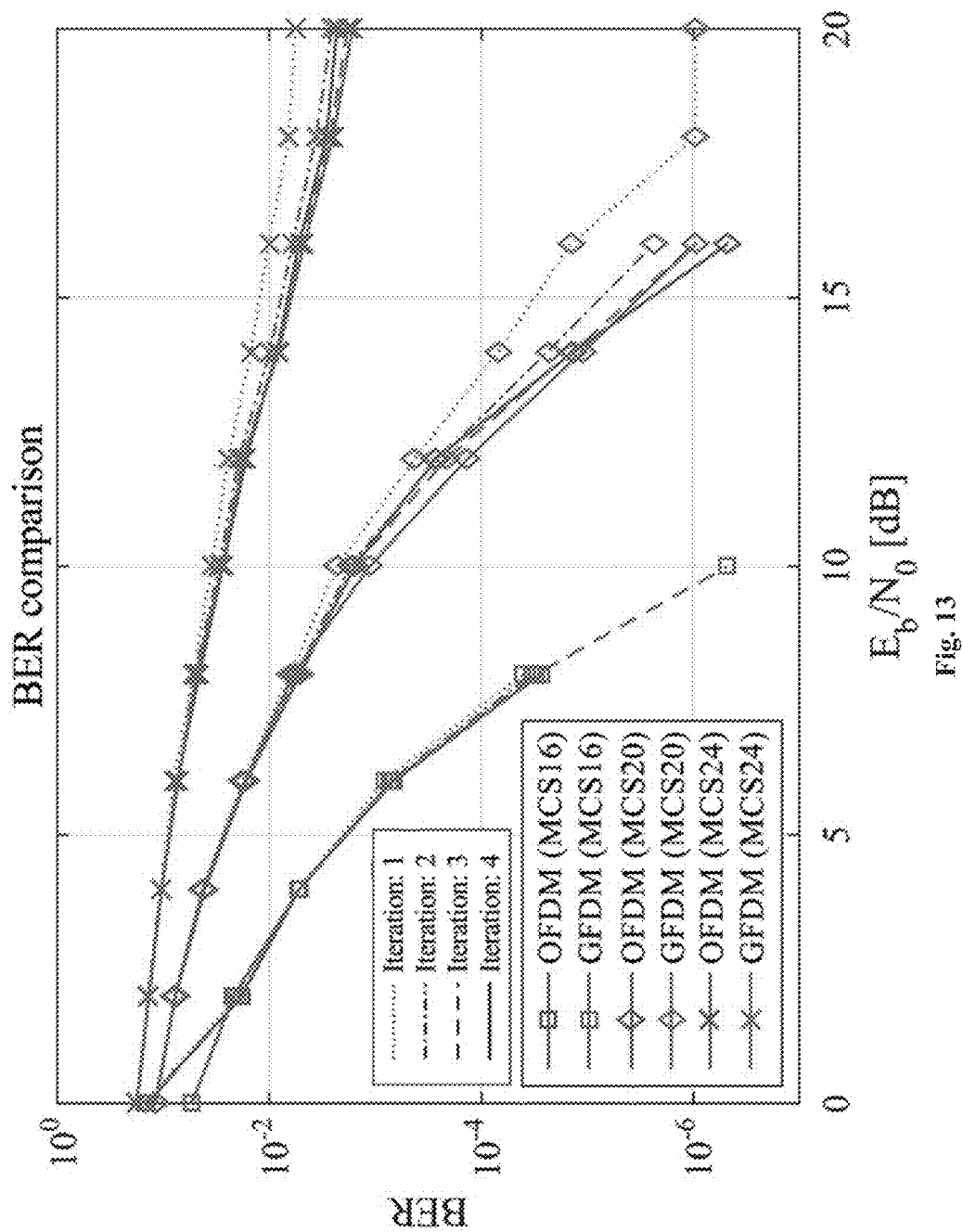
FIG. 13 shows exemplary transmitter side ICI reduction performance.

FIG. 13 shows BER performance using transmitter side ICI reduction. It can be seen that the BER performance becomes almost same as OFDM by introducing iterative calculations. As shown, two times iteration is sufficient for achieving good BER performance.

As discussed, in 60 GHz WiGig/IEEE 802.11ad, Orthogonal Frequency Division Multiplexing (OFDM) is used to achieve higher throughput. However, OFDM has one challenge of a high Peak-to-Average Power Ratio (PAPR) caused by summing up the large number of subcarriers. A high PAPR signal degrades the efficiency of power amplifier (PA) and may cause spurious emission because of the PA non linearity. In order to reduce PAPR, Generalized Frequency Division Multiplexing (GFDM) which has the characteristics of both single carrier and multi carrier transmission has been investigated. By introducing GFDM, the number of subcarrier can be decreased while still maintaining high throughput. Since the symbol structure of GFDM is completely different from that of OFDM, new symbol structure should be considered. One optional embodiment is directed toward a GFDM frame structure for IEEE 802.11ay and/or mmWave systems while still optionally maintaining backward compatibility with IEEE 802.11ad.

The optional embodiments include an adaptation of the GFDM transmission scheme to 60 GHz WiGig/IEEE 802.11ay/mmWave systems. One exemplary frame structure comprises:

i. 60 GHz WiGig/IEEE 802.11ad can include three types of physical frames such as Control PHY, SC PHY (Single Carrier Physical Layer), and OFDM PHY. Each frame can be distinguished thanks to the difference of the Short Training Field (STF), Channel Estimation Field (CEF), and Header information. In order to maintain the backward compatibility, the same preamble structure should be used. An extension includes adding indication fields in the MAC frame which indicate GFDM capability. If both Tx (Transmit) and Rx (Receiver) sides of the communication channel have GFDM capability, GFDM transmission can be established and the GFDM frame can be identified by using PPDU header.
  ii. In order to identify the GFDM frame and demodulate received GFDM symbols correctly, the receiver has to have knowledge of the GFDM symbol configuration. This can be addressed by a Header structure for GFDM identification and symbol demodulation.
  iii. Since the symbol structure of GFDM is completely different from that of OFDM, a new pilot symbol structure has to be implemented.

With any of the above, K can optionally specify the subcarrier spacing and the shifting information can be shared in any one or more of the indication fields, header structure and pilot symbol structure.

Indication Fields

In order to implement GFDM transmission, a GFDM PHY packet should be identified. In 60 GHz WiGig/IEEE 802.11ad, the receiver can distinguish control PHY (CPHY), single carrier PHY (SCPHY) and OFDM PHY thanks to the difference of Short Training Field (STF) and Channel Estimation Field (CEF) in the preamble. For the purpose of maintaining backward compatibility, these preamble fields must be same. Therefore, a two stage identification process can be implemented. First, both the Tx and the Rx side inform about GFDM capabilities. If GFDM communication capabilities are available on both sides of the communications system, a GFDM PHY packet can be transmitted with the indicator.

GFDM capability can optionally be informed by using, for example, the "mmWave Capabilities element" field included in the Management and extension MAC frames. (Of course, other field(s) could also be used.) The exemplary frame structure is shown in FIG. 14. In FIG. 14, 1410 is the exemplary GFDM PHY packet that includes an Element ID, a Length, a STA Address, an AID (Association ID), mmWave STA Capability Information and mmWave PCP/AP Capability information fields. The mmWave STA Capability Information field 1414 can include on or more of the information fields shown in 1420.

The exemplary mmWave STA Capability Information 1420 optionally includes an RXSS Length field, an Antenna Reciprocity field, an A-MPDA (Aggregation-MAC-level Protocol Data Units) Parameter(s) field, a BA (Block ACK) with Flow field, a Supported MCS (Modulation and Coding) Set field, a DTP (Dynamic Tone Pairing) Supported field and one or more reserved fields.

The exemplary Supported MCS Set 1430 includes a Maximum SC Rx MCS field, a Maximum OFDM Rx MCS field, A Maximum SC Tx MCS field, a Maximum OFDM Tx MCS field, a Low Power SC PHY Supported field, a Code Rate 13/16 field and one or Reserved fields.

FIG. 14 also shows the exemplary structure of the mmWave Capabilities element field. Since there are some Reserved bits in the mmWave STA Capability Information field and Supported MCS Set field, they can optionally be used for informing about GFDM capabilities by using, for example, only one bit. As Reserved fields are essentially ignored by legacy devices, this additional bit does not occur any harmful effects.

Header Structure

As discussed, the header structure can optionally also be modified for GFDM in order to report the GFDM configuration to the receiver. Table 1 below shows exemplary header information of OFDM packet.

TABLE 1

OFDM Header

| Field Name | Number of Bits | Start Bit | Description |
| --- | --- | --- | --- |
| Scrambler Initialization | 7 | 0 | Initial Scrambler State |
| MCS | 5 | 7 | Index Into the Modulation and Coding Scheme Table |
| Length | 18 | 12 | Number of Data Octets in the PSDU. Range 0-262143. |
| Additional PPDU | 1 | 30 | A Value of 1 Indicates that this PPDU is Immediately Followed by Another PPDU with no IFS or Preamble on the Subsequent PPDU. A value of 0 Indicates that no Additional PPDU Follows this PPDU. |
| Packet Type | 1 | 31 | 0 - TRN-R Packet, 1 - TRN-T Packet |
| Training Length | 5 | 32 | Indicates the Length of the Training Field |
| Aggregation | 1 | 37 | Set to 1 to Indicate that the PPDU in the Data Portion of the Packet Contains an A-MPDU; Otherwise, Set to 0 |
| Beam Tracking Request | 1 | 38 | Set to 1 to Indicate the Need for Beam Tracking, Otherwise, Set to 0 |
| Tone Pairing Type | 1 | 39 | Set to 0 to Indicate Static Tone Pairing Set to 1 to Indicate Dynamic Tone Pairing |
| DTP Indicator | 1 | 40 | Bit Flip Used to Indicate DTP Update |
| Reserved | 7 | 41 | Set to 0, Ignored by Receiver |
| HCS | 16 | 48 | Header Check Sequence |

In GFDM, typically a tone pairing transmission scheme is not effective because of the small number of subcarriers. Therefore, an exemplary optional embodiment introduces new header fields instead of the tone pairing related fields. Table 2 shows the exemplary header information of a GFDM packet.

TABLE 2

GFDM Header

| Field Name | Number of Bits | Start Bit |
| --- | --- | --- |
| Scrambler Initialization | 7 | 0 |
| MCS | 5 | 7 |
| Length | 18 | 12 |
| Additional PPDU | 1 | 30 |
| Packet Type | 1 | 31 |
| Training Length | 5 | 32 |
| Aggregation | 1 | 37 |
| Beam Tracking Request | 1 | 38 |
| Filter Roll Off Factor | 1 | 39 |
| Number of Subcarriers | 1 | 40 |
| Reserved | 7 | 41 |
| HCS | 16 | 48 |

One can optionally consider that the filter roll off factor can be chosen from 0.1 and 0.4 and the number of subcarrier can be chosen from 6 and 128. For PAPR reduction purposes, the number of subcarriers should be 6, and on the other hand, 128 can be used for ISI reduction, if needed. In IEEE 802.11ay, the Reserved bit 46 can be used for the identification of the frame format, i.e., Single Carrier or OFDM. One optional embodiment uses the Reserved bit 47 to identify the GFDM frame. The bit configuration is shown in Table 3 below.

TABLE 3

Reserved Bit Configuration

| Frame Type | Bit 46 | Bit 47 |
| --- | --- | --- |
| Single Carrier | 0 | 0 |
| OFDM | 1 | 0 |
| Single Carrier | 0 | 1 |
| GFDM | 1 | 1 |

Pilot Symbol Structure

Figure 15:
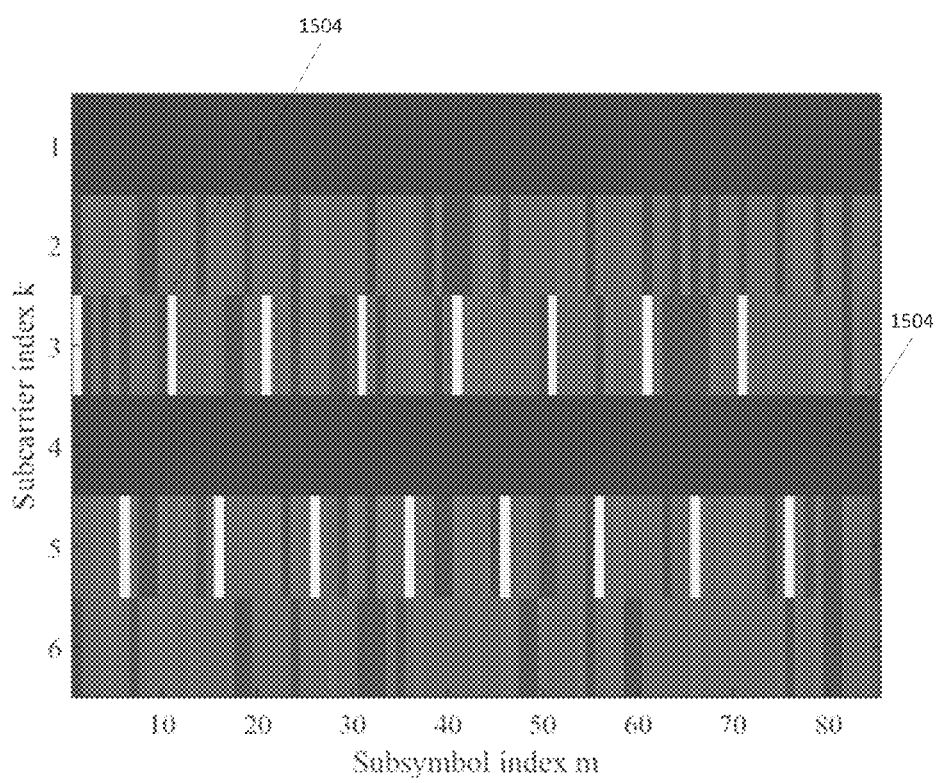
FIG. 15 shows an exemplary pilot structure.

In 60 GHz WiGig/IEEE 802.11ad OFDM PHY, the pilot symbol is mapped onto the specific subcarriers over all time. However, in the case of GFDM, the same pilot structure wastes resources because of the wide subcarrier bandwidth. An exemplary optional embodiment uses a scattered pilot structure that is similar to an LTE packet. FIG. 15 shows the time-frequency grid of one GFDM symbol. The yellow symbols 1504 represents the pilot symbols. The number of pilot symbols can be 16, the same as OFDM, and they are mapped onto the lowest subcarrier and the highest subcarrier in zigzag manner to avoid ICI effects. The time domain spacing can be, for example, [M/16] where M is the number of subsymbols and [x] denotes the largest integer not greater than x.

Figure 16:
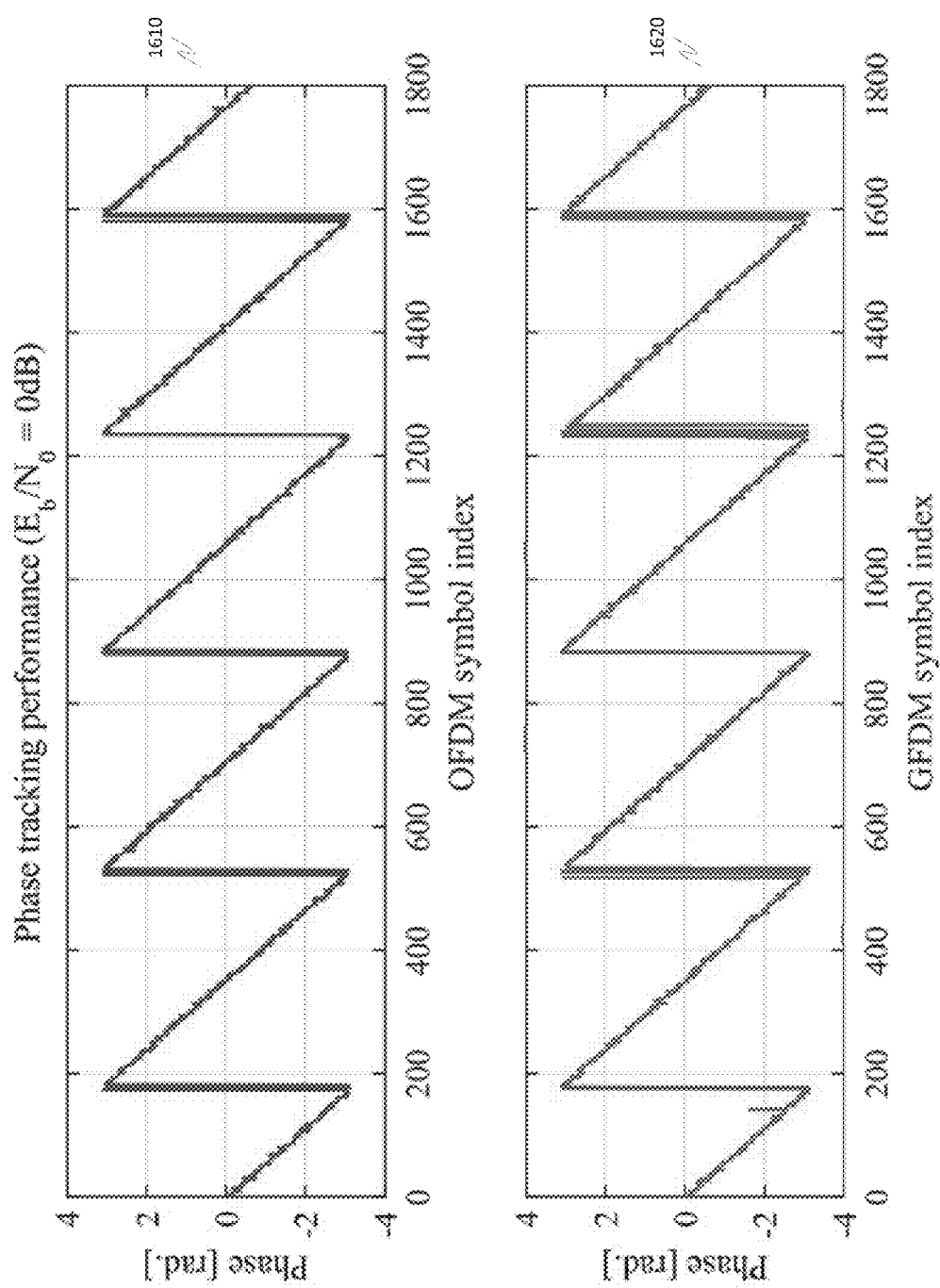
FIG. 16 shows a phase rotation estimation.
Figure 17:
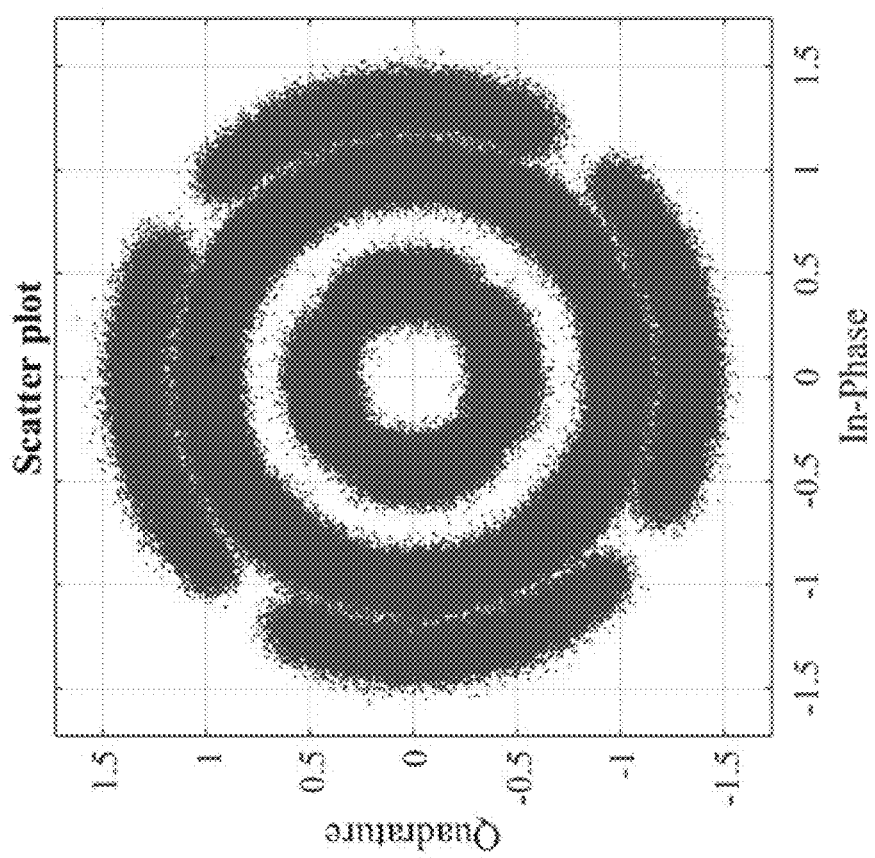
FIGS. 17 and 18 show a constellation comparison.
Figure 18:
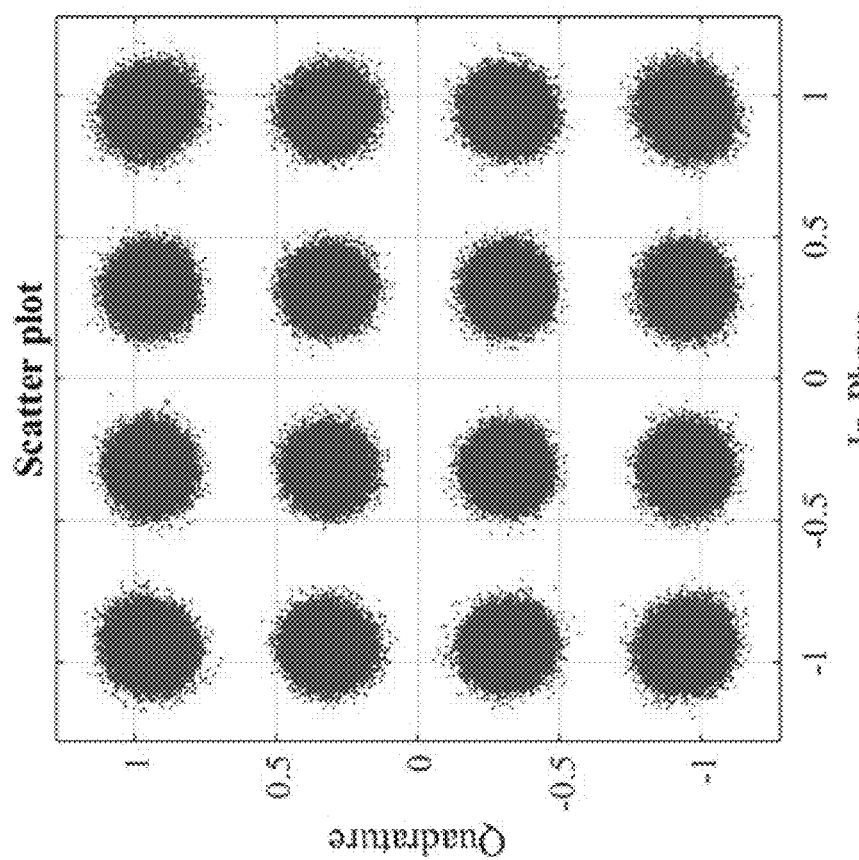

The pilot symbol ca be used for the phase derotation. FIG. 16 shows a phase rotation estimation of OFDM and GFDM. As it can be seen, that there is no significant difference between the OFDM result 1610 and the GFDM result 1620. FIGS. 17 and 18 show the effect of phase rotation and derotation through a constellation comparison. The exemplary pilot structure can detect the phase rotation value and derotate received signal.

Figure 19:
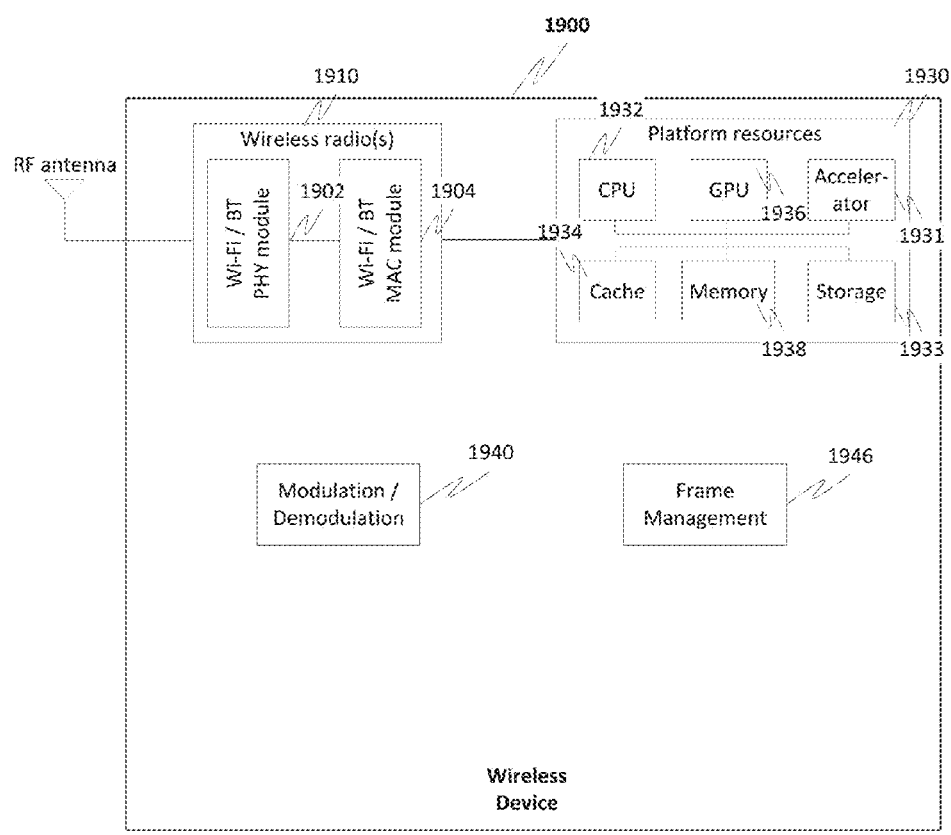
FIG. 19 illustrates a functional block diagram of a wireless device, such as a mobile device.

FIG. 19 illustrates an exemplary functional block diagram of a wireless device 1900, such as a mobile device, that can be used with any one or more of the aspects disclosed herein. In particular, this exemplary architecture, where well-known components have been omitted for clarity, allows the device 1900 to at least utilize GFDM with a reduced PAPR.

More specifically, FIG. 19 illustrates an exemplary wireless/mobile device 1900 that includes a wireless radio 1910, which includes a Wi-Fi/Bluetooth® (BT)/BLE PHY module 1902, a Wi-Fi/BT/BLE MAC module 1904, and one or more interconnected platform resources 1930, such as CPU 1932, cache 1934, GPU 1936, memory 1938, accelerator 1931 and storage 1933.

In addition, the wireless/mobile device 1900 includes modulation/demodulation 1940 and frame management 1946 that operate in accordance with the techniques disclosed herein. The mobile device 1900 can also optionally include one or more sensors (not shown) such as an accelerometer, gyroscope, GPS, Wi-Fi location determination device, and in general any device(s) capable of determining a position or change in position of the device.

Figure 20:
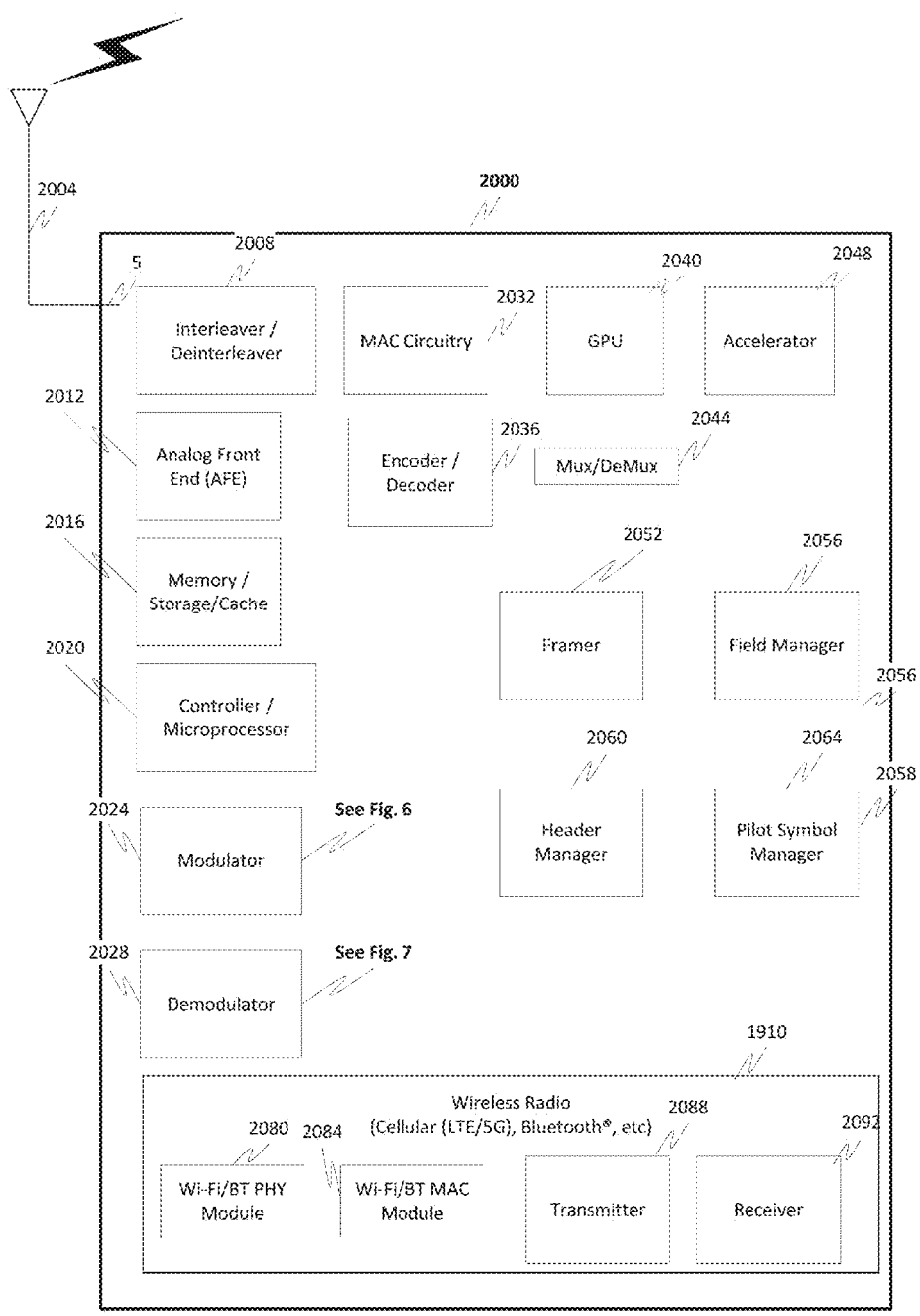
FIG. 20 illustrates a hardware block diagram of an exemplary wireless device, such as a mobile device.

FIG. 20 illustrates an exemplary hardware diagram of a device 2000, such as a wireless device, mobile device, access point, station, or the like, that is adapted to implement the technique(s) discussed herein.

In addition to well-known componentry (which has been omitted for clarity), the device 2000 includes interconnected elements including one or more of: one or more antennas 2004, an interleaver/deinterleaver 2008, an analog front end (AFE) 2012, memory/storage/cache 2016, controller/microprocessor 2020, MAC circuitry 2022, modulator 2020, demodulator 2028, encoder/decoder 2036, GPU 2040, accelerator 2048, a multiplexer/demultiplexer 2044, framer 2052, field manager 2056, header manager 206, pilot symbol manager 2064, and wireless radio 1910 components such as a Wi-Fi PHY module 2080, a Wi-Fi/BT MAC module 2084, transmitter 2088 and receiver 2092. The various elements in the device 2000 are connected by one or more links/connections (not shown, again for sake of clarity).

The device 2000 can have one more antennas 2004, for use in wireless communications such as multi-input multi-output (MIMO) communications, multi-user multi-input multi-output (MU-MIMO) communications Bluetooth®, LTE, 5G, 60 Ghz, WiGig, mmWave systems, etc. The antenna(s) 2004 can include, but are not limited to one or more of directional antennas, omnidirectional antennas, monopoles, patch antennas, loop antennas, microstrip antennas, dipoles, and any other antenna(s) suitable for communication transmission/reception. In one exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users.

Antenna(s) 2004 generally interact with the Analog Front End (AFE) 2012, which is needed to enable the correct processing of the received modulated signal and signal conditioning for a transmitted signal. The AFE 2012 can be functionally located between the antenna and a digital baseband system in order to convert the analog signal into a digital signal for processing and vice-versa.

The device 2000 can also include a controller/microprocessor 2020 and a memory/storage/cache 2016. The device 2000 can interact with the memory/storage/cache 2016 which may store information and operations necessary for configuring and transmitting or receiving the information described herein. The memory/storage/cache 2016 may also be used in connection with the execution of application programming or instructions by the controller/microprocessor 2020, and for temporary or long term storage of program instructions and/or data. As examples, the memory/storage/cache 2020 may comprise a computer-readable device, RAM, ROM, DRAM, SDRAM, and/or other storage device(s) and media.

The controller/microprocessor 2020 may comprise a general purpose programmable processor or controller for executing application programming or instructions related to the device 2000. Furthermore, the controller/microprocessor 2020 can perform operations for configuring and transmitting information as described herein. The controller/microprocessor 2020 may include multiple processor cores, and/or implement multiple virtual processors. Optionally, the controller/microprocessor 2020 may include multiple physical processors. By way of example, the controller/microprocessor 2020 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The device 2000 can further include a transmitter 2088 and receiver 2092 which can transmit and receive signals, respectively, to and from other wireless devices and/or access points using the one or more antennas 2004. Included in the device 2000 circuitry is the medium access control or MAC Circuitry 2032. MAC circuitry 2032 provides for controlling access to the wireless medium. In an exemplary embodiment, the MAC circuitry 2032 may be arranged to contend for the wireless medium and configure frames or packets for communicating over the wireless medium.

The device 2000 can also optionally contain a security module (not shown). This security module can contain information regarding but not limited to, security parameters required to connect the device to an access point or other device or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with the access point and/or another device. The information exchange can occur through encoded messages with the WEP access code often being chosen by the network administrator. WPA is an added security standard that is also used in conjunction with network connectivity with stronger encryption than WEP.

As shown in FIG. 20, the exemplary device 2000 also includes a GPU 2040, an accelerator 2048, multiplexer/demultiplexer 2044, a Wi-Fi/BT/BLE PHY module 2080 and a Wi-Fi/BT/BLE MAC module 2084 that at least cooperate with one or more of the other components as discussed herein.

In operation, the framer 2052 cooperates with one or more of the other system components as discussed to implement the disclosed frame structure that allows GFDM operability and also optionally backward compatibility to IEEE 802.11ad. The field manager 2056 can construct and assemble the various fields as discussed herein including the indication fields and in the MAC frame which can specify whether the transmitter and receiver are GFDM capable as discussed.

The field manager 2056 cooperates with the framer 2052 to specifically manage the indication fields and cooperates with the header manager 2060 to manage the PPDU header and allow the correct symbol demodulation as discussed.

The pilot symbol manager 2064 allows the mapping of the pilot symbol that supports the new pilot symbol structure to the subcarriers as discussed for transmission.

Figure 21:
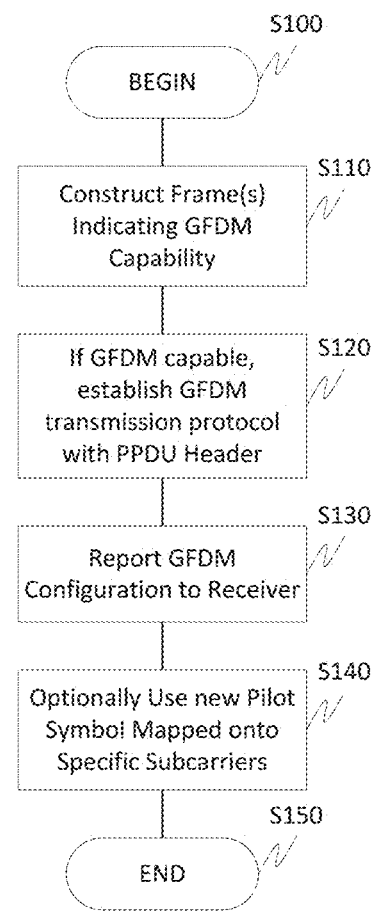
FIG. 21 is a flowchart illustrating an exemplary method for GFDM communications.

FIG. 21 illustrates an exemplary method of improving GFDM communications in accordance with the technologies discussed herein. Control begins in step S100 and continues to step S110. In step S110, one or more frame(s) are constructed indicating GFDM capability. Next, in step S120, and when the transmitter and receiver are GFDM capable, a GFDM transmission protocol is established using, for example, the disclosed PDU header format. Then, in step S130, the GFDM configuration is reported to the receiver. Control then continues to step S140.

In Step S140, the pilot symbol structure is scattered in order to help reduce inter channel interference. Communication can then commence with control continuing to step S150 where the control sequence ends.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analysing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links 5, including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The exemplary embodiments are described in relation to enhanced GFDM communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The exemplary systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

Exemplary aspects are directed toward:
A wireless communications device comprising:
an OFDM modulator that receives a symbol sequence;
the OFDM modulator including one or more subcarrier shifters that receives the symbol sequence and shifts one or more subcarriers to reduce a DC null;
one or more inverse Fast Fourier Transformers that receive information from the one or more subcarrier shifters; and
a transmitter that transmits to a receiver a transmit sequence.

Any one or more of the above aspects further comprising:
an OFDM demodulator that includes one or more Fast Fourier Transformers and one or more second subcarrier shifters to shift and output a receive sequence.

Any one or more of the above aspects, further comprising one or more of a transmitter, a receiver, an interleaver/deinterleaver, an analog front end, a GPU, an accelerator, an encoder/decoder, one or more antennas, a processor and memory.

Any one or more of the above aspects, further comprising one or more filters, a serial to parallel converter, a copy module, a scrambler, an LDPC encoder, a QAM modulator, a cyclic prefix unit and a digital to analog converter, all in electrical communication.

Any one or more of the above aspects, further comprising an analog to digital converter, a QAM demodulator, an LDPC decoder and a descrambler, and a parallel to serial converter, all in electrical communication.

Any one or more of the above aspects, further comprising a framer that provides information about GFDM capability.

Any one or more of the above aspects, further comprising a header manager that reports a GFDM configuration to the receiver.

Any one or more of the above aspects, further comprising a pilot symbol manager to map a pilot symbol onto one or more subcarriers with a scattered pilot structure.

Any one or more of the above aspects, wherein the pilot symbol is usable for phase derotation.

Any one or more of the above aspects further comprising a GFDM header including one or more of the following fields: scrambler initialization, MCS, Length, Additional PPDU, packet Type, Training Length, Aggregation, Beam Tracking Request, Filter Roll Off Factor, and Number of Subcarriers.

Any one or more of the above aspects, configured to one or more of reduce the DC null, improve inter channel interference and improve GFDM communications.

A non-transitory computer-readable information storage media, having stored thereon instructions, that when executed by a processor perform a wireless communication method comprising:

receiving a symbol sequence;

shifting, by a subcarrier shifter, one or more subcarriers to reduce a DC null; performing an inverse Fast Fourier Transform on information received from the one or more subcarrier shifters; and transmitting to a receiver a transmit sequence.

Any one or more of the above aspects, further comprising: performing a Fast Fourier Transform and shifting and outputting a receive sequence.

Any one or more of the above aspects, wherein the processor controls a wireless communications device comprising one or more of a transmitter, a receiver, an interleaver/deinterleaver, an analog front end, a GPU, an accelerator, an encoder/decoder, one or more antennas, a processor and memory.

Any one or more of the above aspects, wherein the processor controls a wireless communications device comprising one or more filters, a serial to parallel converter, a copy module, a scrambler, an LDPC encoder, a QAM modulator, a cyclic prefix unit and a digital to analog converter, all in electrical communication.

Any one or more of the above aspects, wherein the processor controls a wireless communications device comprising an analog to digital converter, a QAM demodulator, an LDPC decoder and a descrambler, and a parallel to serial converter, all in electrical communication.

Any one or more of the above aspects, wherein the processor controls a wireless communications device comprising a framer that provides information about GFDM capability.

Any one or more of the above aspects, wherein the processor controls a wireless communications device comprising a header manager that reports a GFDM configuration to the receiver.

Any one or more of the above aspects, wherein the processor controls a wireless communications device comprising a pilot symbol manager to map a pilot symbol onto one or more subcarriers with a scattered pilot structure.

Any one or more of the above aspects, wherein the pilot symbol is usable for phase derotation.

Any one or more of the above aspects, wherein a GFDM header includes one or more of the following fields: scrambler initialization, MCS, Length, Additional PPDU, packet Type, Training Length, Aggregation, Beam Tracking Request, Filter Roll Off Factor, and Number of Subcarriers.

Any one or more of the above aspects, wherein the wireless communication method is configured to one or more of reduce the DC null, improve inter channel interference and improve GFDM communications.

A wireless GFDM communications device comprising:

means receiving a symbol sequence;

means for shifting, by a subcarrier shifter, one or more subcarriers to reduce a DC null;

means for performing an inverse Fast Fourier Transform on information received from the one or more subcarrier shifters; and means for transmitting to a receiver a transmit sequence.

A wireless GFDM communications method comprising:

receiving a symbol sequence;

shifting, by a subcarrier shifter, one or more subcarriers to reduce a DC null;

performing an inverse Fast Fourier Transform on information received from the one or more subcarrier shifters; and transmitting to a receiver a transmit sequence.

A system on a chip (SoC) including any one or more of the above aspects.

One or more means for performing any one or more of the above aspects.

Any one or more of the aspects as substantially described herein.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

Furthermore, it should be appreciated that the various links, including communications channel(s), connecting the elements (which may not be not shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, Wi-Fi, LTE, 4G, Bluetooth®, WirelessHD, WiGig, WiGi, 3GPP, Wireless LAN, WiMAX, and the like.

The term transceiver as used herein can refer to any device that comprises hardware, software, circuitry, firmware, or any combination thereof and is capable of performing any of the methods, techniques and/or algorithms described herein.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has at least been provided systems and methods for enhanced GFDM communications. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A Generalized Frequency Division Multiplexing (GFDM) wireless communications device comprising:
   a modulator that receives a symbol sequence;
   the modulator including one or more subcarrier shifters that receives the symbol sequence and upshifts or down shifts one or more subcarriers to reduce a direct current (DC) null;
   one or more inverse Fast Fourier Transformers that receive information from the one or more subcarrier shifters;
   a transmitter-side inter carrier interference (ICI) block; and
   a transmitter that transmits to a receiver a transmit sequence.

2. The device of claim 1, further comprising:
   an OFDM demodulator that includes one or more Fast Fourier Transformers and one or more second subcarrier shifters to shift and output a receive sequence.

3. The device of claim 1, further comprising one or more of a transmitter, a receiver, an interleaver/deinterleaver, an analog front end, a graphics processing unit (GPU), an accelerator, an encoder/decoder, one or more antennas, a processor and memory.

4. The device of claim 1, further comprising one or more filters, a serial to parallel converter, a copy module, a scrambler, a Low Density Parity Code (LDPC) encoder, a Quadrature Amplitude (QAM) modulator, a cyclic prefix unit and a digital to analog converter, all in electrical communication.

5. The device of claim 1, further comprising an analog to digital converter, a Quadrature Amplitude (QAM) demodulator, a Low Density Parity Code (LDPC) decoder and a descrambler, and a parallel to serial converter, all in electrical communication.

6. The device of claim 1, further comprising a framer that provides information about Generalized Frequency Division Multiplexing (GFDM) capability.

7. The device of claim 6, further comprising a header manager that reports a GFDM configuration to the receiver.

8. The device of claim 1, further comprising a pilot symbol manager to map a pilot symbol onto one or more subcarriers with a scattered pilot structure.

9. The device of claim 8, wherein the pilot symbol is usable for phase derotation.

10. The device of claim 1, further comprising a Generalized Frequency Division Multiplexing (GFDM) header including one or more of the following fields: scrambler initialization, Modulation and Coding (MCS), Length, Additional Protocol Data Unit (PPDU), packet Type, Training Length, Aggregation, Beam Tracking Request, Filter Roll Off Factor, and Number of Subcarriers.

11. The device of claim 1, configured to one or more of reduce the direct current (DC) null, improve inter channel interference and improve Generalized Frequency Division Multiplexing (GFDM) communications.

12. A non-transitory computer-readable information storage media, having stored thereon instructions, that when executed by a processor perform a Generalized Frequency Division Multiplexing (GFDM) wireless communication method comprising:
receiving a symbol sequence;
upshifting or down shifting, by a subcarrier shifter, one or more subcarriers to reduce a direct current (DC) null;
performing an inverse Fast Fourier Transform on information received from the one or more subcarrier shifters;
performing, on a transmitter-side, inter carrier interference (ICI) reduction; and
transmitting to a receiver a transmit sequence.

13. The non-transitory computer-readable information storage media of claim 12, further comprising:
performing a Fast Fourier Transform and shifting and outputting a receive sequence.

14. The non-transitory computer-readable information storage media of claim 12, wherein the processor controls a wireless communications device comprising one or more of a transmitter, a receiver, an interleaver/deinterleaver, an analog front end, a Graphics Processing Unit (GPU), an accelerator, an encoder/decoder, one or more antennas, a processor and memory.

15. The non-transitory computer-readable information storage media of claim 12, wherein the processor controls a wireless communications device comprising one or more filters, a serial to parallel converter, a copy module, a scrambler, an Low Density Parity Code (LDPC) encoder, a Quadrature Amplitude (QAM) modulator, a cyclic prefix unit and a digital to analog converter, all in electrical communication.

16. The non-transitory computer-readable information storage media of claim 12, wherein the processor controls a wireless communications device comprising an analog to digital converter, a Quadrature Amplitude (QAM) demodulator, an Low Density Parity Code (LDPC) decoder and a descrambler, and a parallel to serial converter, all in electrical communication.

17. The non-transitory computer-readable information storage media of claim 12, wherein the processor controls a wireless communications device comprising a framer that provides information about Generalized Frequency Division Multiplexing (GFDM) capability.

18. The non-transitory computer-readable information storage media of claim 12, wherein the processor controls a wireless communications device comprising a header manager that reports a Generalized Frequency Division Multiplexing (GFDM) configuration to the receiver.

19. The non-transitory computer-readable information storage media of claim 12, wherein the processor controls a wireless communications device comprising a pilot symbol manager to map a pilot symbol onto one or more subcarriers with a scattered pilot structure.

20. The non-transitory computer-readable information storage media of claim 19, wherein the pilot symbol is usable for phase derotation.

21. The non-transitory computer-readable information storage media of claim 12, wherein a GFDM header includes one or more of the following fields:
scrambler initialization, Modulation and Coding (MCS), Length, Additional protocol data unit (PPDU), packet Type, Training Length, Aggregation, Beam Tracking Request, Filter Roll Off Factor, and Number of Subcarriers.

22. The non-transitory computer-readable information storage media of claim 12, wherein the wireless communication method is configured to one or more of reduce the direct current (DC) null, improve inter channel interference and improve Generalized Frequency Division Multiplexing (GFDM) communications.

23. A wireless Generalized Frequency Division Multiplexing (GFDM) communications device comprising:
a means for receieving a symbol sequence;
a means for upshifting or down shifting, by a subcarrier shifter, one or more subcarriers to reduce a direct current (DC) null;
a means for performing an inverse Fast Fourier Transform on information recieved from the one or more subcarrier shifters;
means for reducing inter carrier interference (ICI) by performing transmitter-side ICI; and
means for transmitting to a reciever a transmit sequence.

24. A wireless Generalized Frequency Division Multiplexing (GFDM) communications method comprising:
receiving a symbol sequence;
upshifting or down shifting, by a subcarrier shifter, one or more subcarriers to reduce a direct current (DC) null;
performing an inverse Fast Fourier Transform on information received from the one or more subcarrier shifters;
performing, on a transmmitter-side, inter carrier interference (ICI) reduction; and
transmitting to a receiver a transmit sequence.

* * * * *

UNITED STATES PATENT AND TRADEMARK OFFICE
CERTIFICATE OF CORRECTION

PATENT NO. : 9,973,364 B2
APPLICATION NO. : 15/193374
DATED : May 15, 2018
INVENTOR(S) : Hidekazu Shimodaira et al.

It is certified that error appears in the above-identified patent and that said Letters Patent is hereby corrected as shown below:

On the Title Page

• At item (54) "Title", Column 1, Line 5, please delete "STRUCUTRE" and insert -- STRUCTURE --, therefore.

In the Claims

• At Column 18, Claim 23, Line 38, delete "receieving" and insert -- receiving --, therefore.

• At Column 18, Claim 24, Line 56, delete "transmmitter-side" and insert -- transmitter-side --, therefore.

Signed and Sealed this
Sixteenth Day of October, 2018

Andrei Iancu
*Director of the United States Patent and Trademark Office*